W. SPARKS.
ELECTRIC MOTOR.
APPLICATION FILED SEPT. 11, 1914.

1,239,056.

Patented Sept. 4, 1917.

WITNESSES:
H. V. Hurst
H. E. Chase

INVENTOR.
Wm Sparks
BY Howard P. Denison
ATTORNEY.

UNITED STATES PATENT OFFICE.

WILLIAM SPARKS, OF JACKSON, MICHIGAN, ASSIGNOR TO THE SPARKS-WITHINGTON COMPANY, A CORPORATION OF OHIO.

ELECTRIC MOTOR.

1,239,056. Specification of Letters Patent. Patented Sept. 4, 1917.

Application filed September 11, 1914. Serial No. 861,220.

*To all whom it may concern:*

Be it known that I, WILLIAM SPARKS, a citizen of the United States, residing in the city of Jackson, in the county of Jackson, in the State of Michigan, have invented new and useful Improvements in Electric Motors, of which the following, taken in connection with the accompanying drawings, is a full, clear, and exact description.

This invention relates to certain improvements in electrically operated horns, involving the use of a vibratory diaphragm and a motor driven actuator therefor, and refers more particularly to the electrical distributing system of the motor.

A particular feature of this type of horn is that the commutator brushes are held in contact with the commutator by coil springs which heretofore have formed parts of the electrical connections between the brushes and field windings of the motor.

These springs are usually made of tempered steel, such as piano wire, and when used as current conductors are liable to lose a greater or less degree of resiliency by reason of the heat developed therein after a short period of use, thereby reducing the efficiency of the motor.

The main object, therefore, is to maintain a higher efficiency of the motor than has heretofore been possible by conducting the current from the brushes to the terminal ends of the field winding around the springs through the medium of separate conductors of less electrical resistance than that of the springs.

Other objects and uses will be brought out in the following description.

In the drawings, Figure 1 is a longitudinal sectional view of the motor showing the means for conducting the current around the brush-actuating springs, and Figs. 2 and 3 are perspective views one of the brush-holders and one of the conductors therefor.

The illustrated portion of the horn comprises an internally threaded ring —3—, the latter being screwed upon the externally threaded end of the cylindrical motor case —4—, and is held in its adjusted position by a lock nut —5— also engaging the threaded end of the case —4— and abutting against the outer face of the ring —3— which is concavo-convex and arranged with its concave side facing the diaphragm to afford ample space for the vibration of a diaphragm and a rotary actuator —6—.

The motor case contains the usual pole-pieces and field windings for coöperation with a revolving armature —7—, having the ends of its shaft journaled in suitable bearings —8— and —9— in the opposite ends of the motor case. The motor may be inclosed by a cylindrical dust protective shield —13—.

In Fig. 1 is shown a pair of diametrically opposite commutator brushes —15— as slidably mounted in sheet metal guides or boxes —16— which together with the terminal ends —17— of the field windings of the motor are secured to the adjacent sides of the motor case —4— by screws —18— and serve to receive and retain a pair of coil springs —19— for yieldingly holding said brushes in contact with the commutator.

These springs are usually made of tempered wire, such as piano wire, and if used as conductors for the current are more or less liable to deterioration by overheating which would of course reduce the efficiency of the motor and in order to overcome this liability, I have provided extra conductors —20— of less electrical resistance than that of the springs and extended along the outside thereof with one end in sliding electrical contact with their respective brushes at the inner ends of the springs and their outer ends in electrical connection with the adjacent terminals of the field windings of the motor so as to pass the current around the springs.

As shown, each of the conductors —20— is provided with an enlarged flat head or base —21— and a spring arm —22— of reduced width, the flat base —21— being offset at an angle to the spring arm —22— and interposed between the outer end of its coil spring —19— and adjacent end of the brush-holder —16— while the spring arm —22— projects through and is guided in a lengthwise slot —23— in one side of the brush-holder, and is spring-pressed into contact with the corresponding side of the brush thus completing the circuit around and independently of the coil spring.

One of the terminals of each field winding is clamped between the outer end of the corresponding brush-holder and motor case by the adjacent screw —18— which engages in a threaded aperture in the adjacent end of the brush-holder to firmly hold the latter in operative position.

The outer end of the motor case —4— is partially closed by a cross bar —25— in connection with which the end thrust bearing for the motor shaft is formed.

Although I have shown and described one specific construction and relative arrangement of the parts, I do not desire to limit myself to the same, as changes may be made in the details of both construction and arrangement without departing from the spirit of this invention as set forth in the appended claims.

What I claim is:

1. In a motor, a tubular brush-holder, a brush slidable within and substantially fitting the holder, a spring within the holder at the rear of the brush normally tending to eject the brush from the holder, and a spring finger having a portion positioned between the rear of the holder and said spring and another portion extending outside the holder and having an end part in contact with the brush in front of the spring for conveying current around the spring.

2. In a motor, a frame, a tubular brush-holder secured to the frame, said holder having a longitudinal slot along one side, a brush slidable within and substantially fitting the holder, a spring at the rear of the brush and normally tending to eject the brush from the holder, and a spring finger having a portion within the holder at the rear of the spring and another portion extending through said slot and provided with an end part in contact with the brush in front of the spring to convey current around the spring.

3. In a motor, a frame, a bolt engaged with the frame, a tubular brush-holder having one end adapted for engagement with said bolt, said tubular holder provided with a longitudinal slot extending along one side of the holder, a brush slidable within and substantially fitting the holder, a spring between the rear end of the holder and the brush and normally tending to eject the brush from the holder, and a conductor having a portion positioned within the holder and between the spring and said bolt and another portion extending through said slot and provided with an end part in contact with the brush for conveying current around the spring.

In witness whereof I have hereunto set my hand this 31st day of August, 1914.

WILLIAM SPARKS.

Witnesses:
LILLIAN WUNDERLICH,
W. B. PATCH.